(12) United States Patent
Young et al.

(10) Patent No.: US 6,572,502 B1
(45) Date of Patent: Jun. 3, 2003

(54) CHAIN TENSIONER DEVICE FOR USE IN A CONFINED SPACE

(75) Inventors: James D. Young, Chesaning, MI (US); Anthony S. Ferenc, Goodrich, MI (US)

(73) Assignee: Cloyes Gear and Products, Inc., Mentor, OH (US)

( * ) Notice: Subject to any disclaimer, the term of this patent is extended or adjusted under 35 U.S.C. 154(b) by 0 days.

(21) Appl. No.: 09/502,541

(22) Filed: Feb. 10, 2000

Related U.S. Application Data
(60) Provisional application No. 60/119,570, filed on Feb. 10, 1999, and provisional application No. 60/121,908, filed on Feb. 26, 1999.

(51) Int. Cl.[7] ................................................. F16H 7/08
(52) U.S. Cl. ...................................... 474/111; 474/140
(58) Field of Search ................................ 474/110, 140, 474/119, 111, 101, 109, 133, 136, 112, 117, 138, 113, 123; 123/90.31, 90.27, 90.15; 264/255, 250, 241

(56) References Cited

U.S. PATENT DOCUMENTS

| | | |
|---|---|---|
| 3,490,302 A | 1/1970 | Turner et al. |
| 4,832,664 A | 5/1989 | Gröger et al. |
| 4,921,472 A | 5/1990 | Young |
| 5,184,983 A * | 2/1993 | Shimaya et al. ............. 474/111 |
| 5,286,234 A | 2/1994 | Young |
| 5,425,680 A | 6/1995 | Young |
| 5,690,569 A * | 11/1997 | Ledvina et al. ............. 474/111 |
| 5,711,732 A | 1/1998 | Ferenc et al. |
| 5,797,818 A | 8/1998 | Young |
| 5,957,793 A * | 9/1999 | Schulze ................... 474/111 X |
| 5,961,411 A * | 10/1999 | Tsutsumi et al. ............. 474/111 |

* cited by examiner

*Primary Examiner*—Marcus Charles
(74) *Attorney, Agent, or Firm*—Fay, Sharpe, Fagan, Minnich & McKee, LLP

(57) ABSTRACT

A chain tensioner apparatus utilizes a synthetic plastic (e.g. nylon) bracket that permits a fastener at a pivot end of the bracket to serve as a pivot pin for a shoe sub-assembly as well as a bracket fastener. A free end fastener can be positioned very close to, or substantially below, a reaction surface of the bracket. An interlocking feature is provided at a pivot end of the bracket/shoe sub-assembly and serves to maintain an interlock of the shoe-to-bracket in cooperation with an installation pin. Additionally, a positioning feature is used at the pivot end of the bracket. In order to permit the free rotation of the shoe relative to the bracket, the pivot end of the bracket is not clamped rigidly to the engine case when a pivot end bolt is installed. Further, a dowel pin can be used at the pivot end of the bracket.

5 Claims, 17 Drawing Sheets

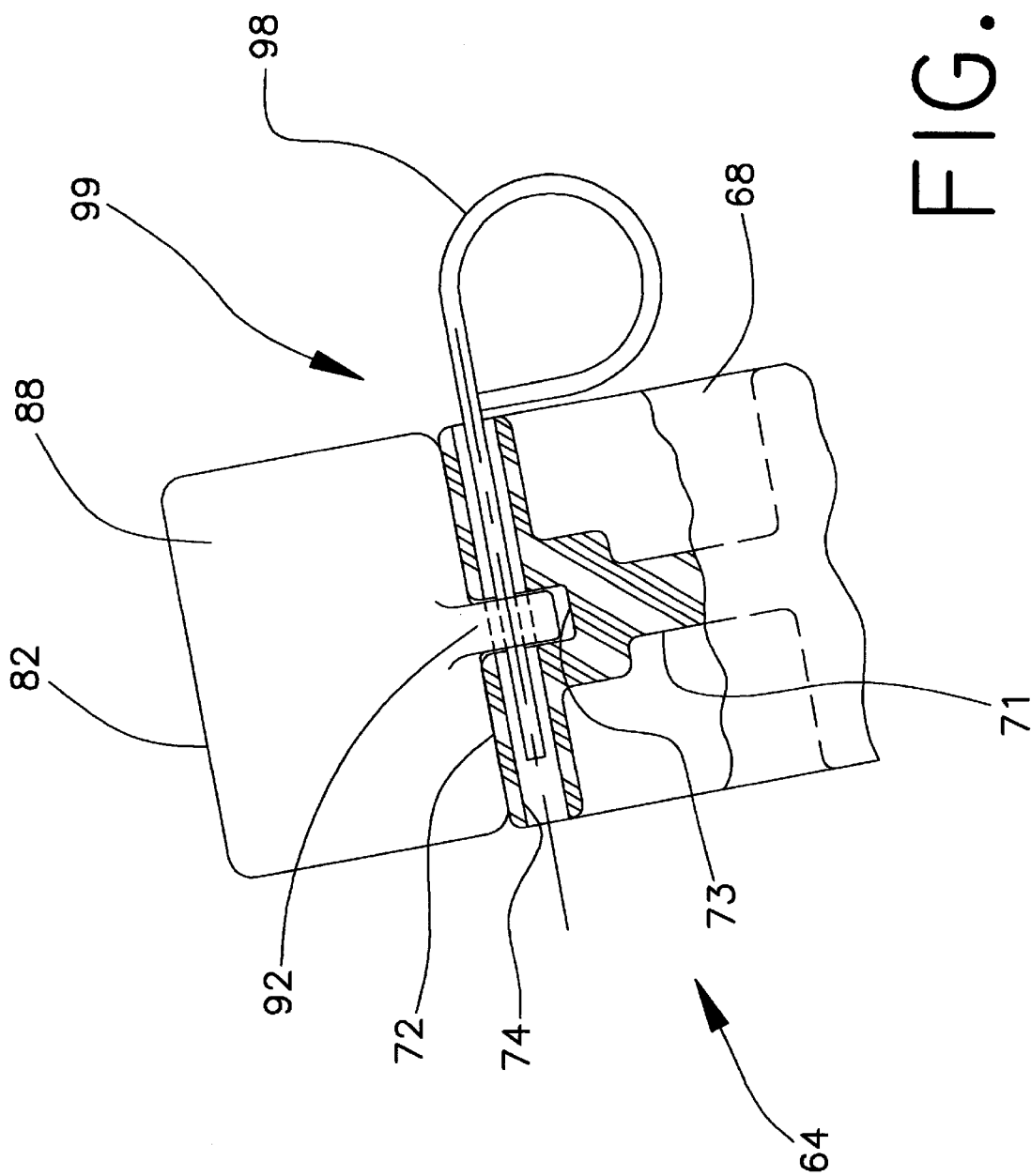

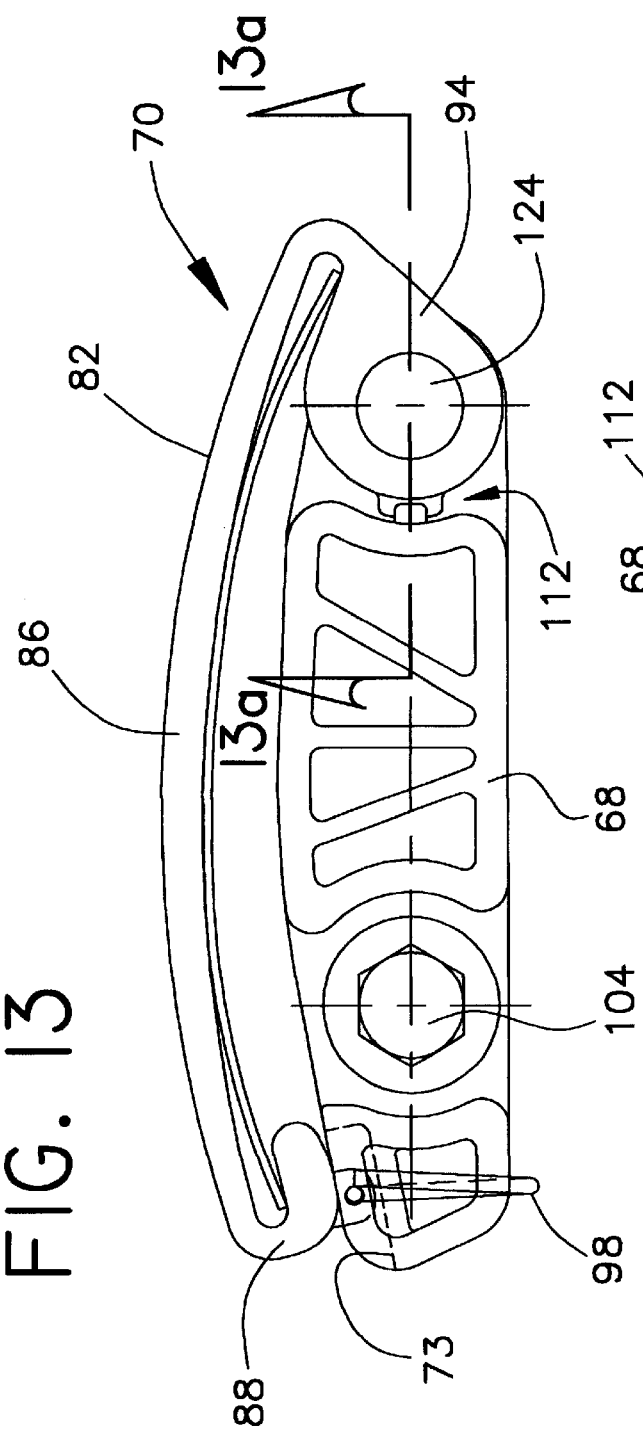
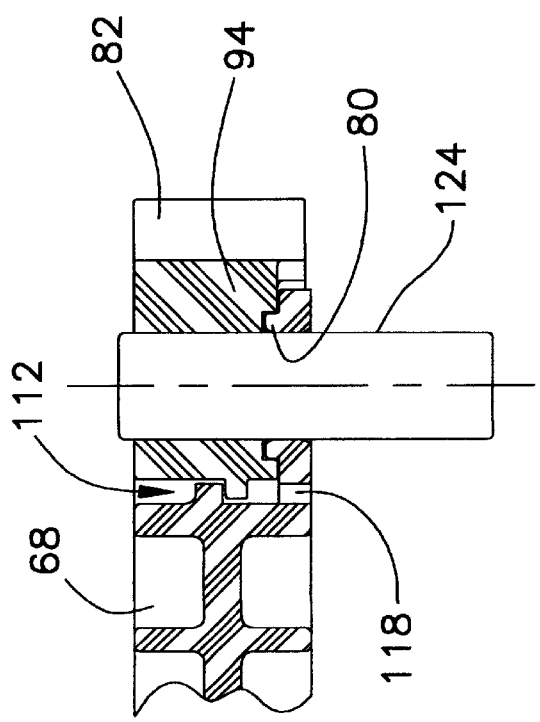
FIG. 13
FIG. 13a

CHAIN TENSIONER DEVICE FOR USE IN A CONFINED SPACE

CROSS REFERENCE TO RELATED APPLICATION

This application claims the benefit of Provisional U.S. Patent Application Serial Nos. 60/119,570, filed Feb. 10, 1999, and 60/121,908, filed Feb. 26, 1999.

FIELD OF THE INVENTION

The present invention relates to the automotive timing chain art. The preferred embodiments of the invention find particular application in conjunction with a chain tensioner device for use in confined spaces that applies a tensioning force to a drive chain traveling therepast, and will be described with particular reference thereto.

BACKGROUND OF THE INVENTION

Chain guides and various mechanical tensioning devices are used in many internal combustion engine timing chain drive applications. With reference to FIG. 1, a conventional chain drive system 10 rotates in a clockwise direction as shown by arrow 11. The chain drive system 10 includes at least a drive sprocket 12, a driven sprocket 14, and a chain 16 (e.g. roller chain, inverted tooth chain, etc.) having a number of chain links 18. As known in the art, the chain drive system 10 can include additional sprockets such as idler sprockets, balance shaft sprockets, etc.

The chain 16 engages and wraps about sprockets 12 and 14 and has two spans extending between the sprockets, slack strand 20 and taut strand 22. A central portion of the taut strand 22 may be guided between the driven sprocket 14 and the drive sprocket 12 with a conventional chain guide (not shown). The taut strand 22 of chain 16 is under tension as shown by arrows 26.

A conventional blade-type mechanical tensioner assembly 24 applies a tensioning force to the slack strand 20. The tensioner assembly 24 includes a bracket 28, typically formed by stamping as a rigid metal bracket, and an elongate shoe sub-assembly 30. The bracket 28 includes a pin 32, typically resistance welded to the bracket at a pivot end thereof, to provide for shoe support and rotation capability. The bracket 28 also includes a ramp 33, acting as a bearing surface, at the opposite or bracket free end to provide for the required shoe translation as well as reaction support.

The shoe sub-assembly 30 includes a chain-engaging shoe member 34, and a blade spring 36 that provides the shoe sub-assembly 30 with the resiliency and rigidity that is necessary to apply the proper amount of tensioning force to the slack strand 20. The tensioning shoe or blade 34 is typically molded using a heat-stabilized nylon. The blade spring 36 is typically formed from spring steel, and is mechanically interlocked to the shoe.

The tensioner design, as well as the method and order of installing the tensioner to an automotive engine, is normally determined by the packaging parameters. Fastener location, an integral part of the packaging parameters, is always an important design issue. For instance, the packaging parameters of the drive 10 permit and/or require that a first fastener 40a be located outside a path of expected chain travel, and a second fastener 40b be located inside the path of expected chain travel. Both fasteners 40a, 40b clamp the bracket 28 to an engine case or block. The bracket 28 is positioned to properly orient the chain-engaging shoe member 34 with respect to the slack strand 20 that is located between the fasteners 40a, 40b.

The use of a stamped metal bracket is a reasonable design approach when the fasteners can be positioned at a desired location, and have a desired separating distance, while at the same time not interfering with a preferred pivot location or a preferred free end ramp location. A disadvantage of the prior art tensioner 24 is that the free end ramp 33 of the stamped metal bracket 28 does not permit a fastener (e.g. 40a, 40b) to be located either below or close to the reaction surface of the ramp.

That is, the ramp 33 is formed by stamping the metal bracket so that an edge thereof is angled substantially perpendicular (orthogonal when viewed in FIG. 1) to the remainder of the bracket. The tab 33a is then bent substantially perpendicular to the ramp 33 so that the tab 33a extends substantially parallel with the remainder of the bracket. Thus, there is no bracket material proximate the tab 33a with which to provide an aperture for a fastener. The fastener locations must necessarily be placed on the remainder of the bracket that was not bent to form the ramp 33 and the tab 33a. This can be a problem when a preferred fastening location is in fact below or in close proximity to the ramp.

Accordingly, it is considered desirable to provide a new and improved a chain tensioner device that meets the above-stated needs and overcomes the foregoing difficulties and others while providing better and more advantageous results.

SUMMARY OF THE INVENTION

The principal object of the present invention is to provide a mechanical tensioner assembly that can package in confined spaces, primarily for automotive engine chain drives.

In accordance with one aspect of the present invention, a chain tensioner is provided. The chain tensioner includes a bracket and a shoe sub-assembly pivotally secured to the bracket, wherein the shoe sub-assembly is formed from a plastic material and the bracket is formed from a plastic material with a filler material added thereto.

In accordance with another aspect of the present invention, a method of assembling a chain tensioner having a bracket and a shoe sub-assembly is disclosed. The shoe sub-assembly is formed from a plastic material and the bracket formed from a plastic material with a filler material added thereto. The bracket includes a recess, an aperture, and a raised hub surrounding the aperture. The shoe sub-assembly includes a blade locking tab and a tab portion having a tab aperture with a counterbored portion. The method includes the steps of joining the shoe sub-assembly to the bracket such that the raised hub is positioned within the counterbored aperture portion; rotating the shoe sub-assembly relative to the bracket to position the blade locking tab within the recess; and inserting a removable installation ring through the blade locking tab and the recess to lock the shoe sub-assembly to the bracket to provide a one-piece tensioner assembly.

The present invention utilizes a synthetic plastic (e.g. nylon) bracket that permits a fastener at a pivot end of the bracket to serve as a pivot pin for a shoe sub-assembly as well as a bracket fastener. It also allows for greater flexibility for the fastener location at a free end of the bracket. A preferred and more robust nylon bracket design permits the free end fastener to be positioned very close to, or substantially below, a reaction surface of the bracket. The nylon bracket serves to reduce the weight of the tensioner assembly. Another advantage is that the nylon bracket is more cost-effective than a metal bracket. Further, the nylon bracket beneficially decreases the transmission of noise and vibration compared to a steel bracket, thereby enhancing NVH characteristics of the drive.

The present invention beneficially utilizes an interlocking feature at the pivot end, which serves to advantageously maintain an interlock of the shoe-to-bracket in cooperation with an installation pin. Additionally, a "positioning feature" is disclosed in a bracket mounting hole. The positioning feature is used at the pivot end of the bracket. In order to permit the free rotation of the shoe, the pivot end of the bracket is necessarily not clamped rigidly to the engine case when a pivot end bolt is installed. Further, the utilization of a cost-effective dowel pin at the pivot end of the bracket is also disclosed.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

FIG. 3c is a section view of the tensioner taken along the line 3c—3c through the pivot end of the tensioner of FIG. 3a;

FIG. 4 is an enlarged end view, partially broken-away, of the tensioner free end taken from the direction of arrow 4 in FIG. 2;

FIG. 8b is a partial rear view of the pivot area taken along the line 8b—8b of FIG. 8a;

FIG. 13 is a principal view of a tensioner in accordance with a sixth embodiment of the present invention; and FIG. 13a is a partial view, in section, of the pivot end of the tensioner taken along the line 13a—13a of FIG. 13.

DETAILED DESCRIPTION OF THE PREFERRED EMBODIMENTS

Figure 1:
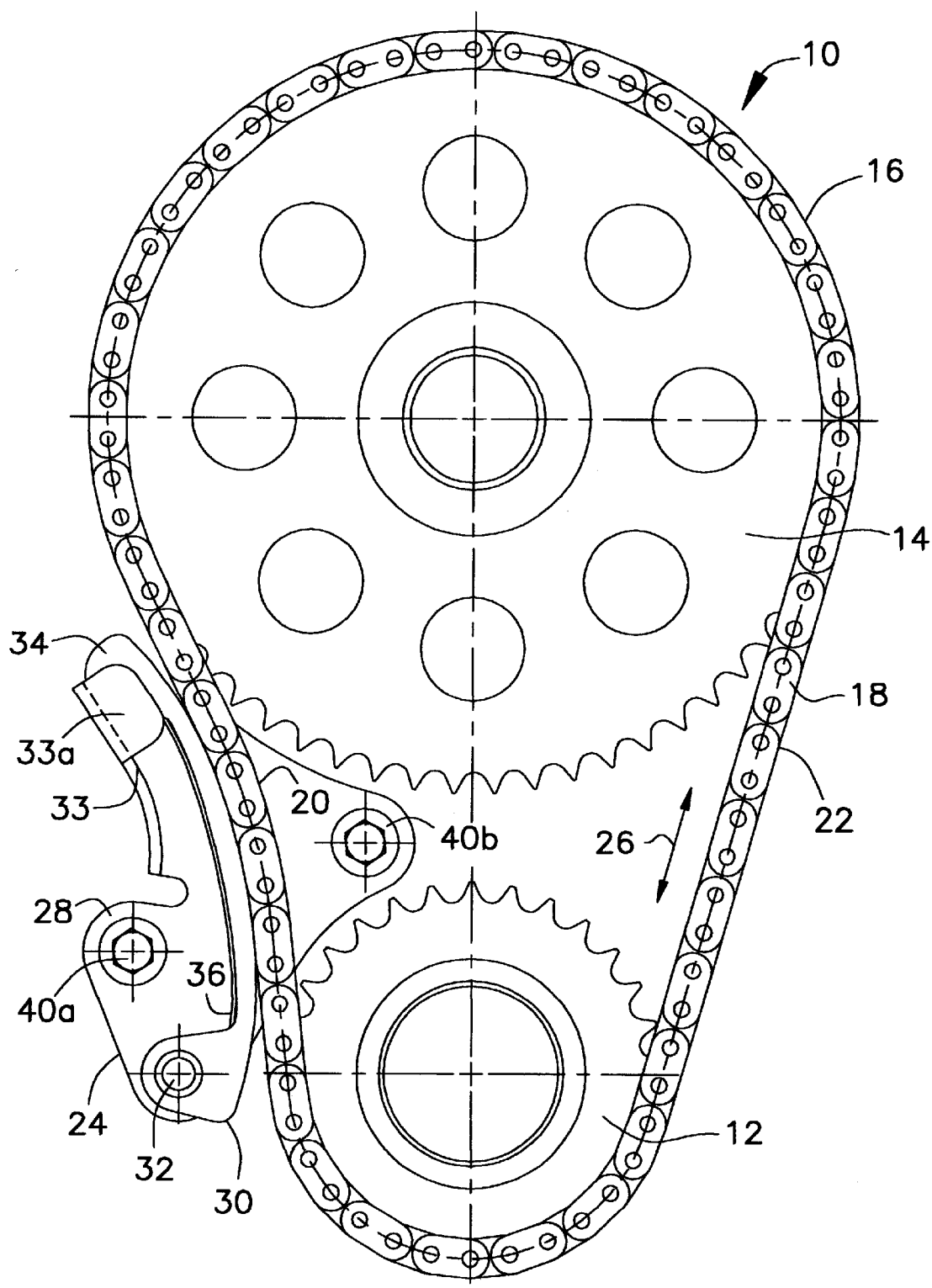
FIG. 1 illustrates an exemplary automotive chain drive installation including a conventional blade-type mechanical tensioning device or tensioner.
Figure 2:
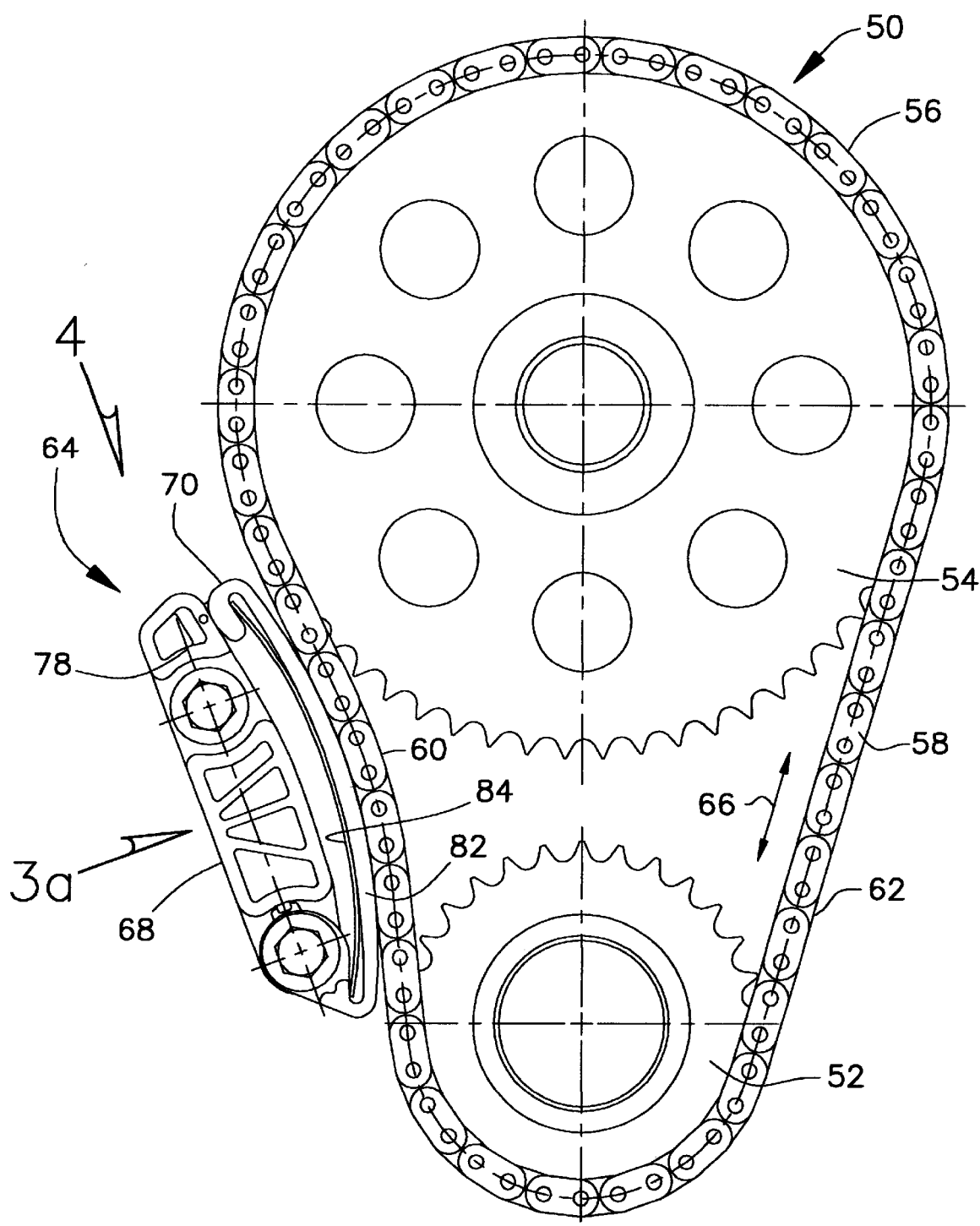
FIG. 2 illustrates an exemplary automotive chain drive installation including a blade-type mechanical tensioning device or tensioner that incorporates the features of the present invention therein.

FIGS. 2–4a illustrate a first embodiment of a chain tensioner that incorporates the features of the present invention therein. With particular reference to FIG. 2, an exemplary automotive chain drive system 50 includes a drive sprocket 52, a driven sprocket 54, and a chain 56 (e.g. roller chain, inverted tooth chain, etc.) having a number of chain links 58. It is contemplated that the chain drive system 50 can include additional sprockets such as idler sprockets, balance shaft sprockets, etc.

The chain 56 engages and wraps about sprockets 52 and 54 and has two spans extending between the sprockets, slack strand 60 and taut strand 62. A central portion of the taut strand 62 may be guided between the driven sprocket 54 and the drive sprocket 52 with a conventional chain guide (not shown). The taut strand 62 is under tension as shown by arrows 66.

A chain tensioner 64 applies a tensioning force to the slack strand 60. Certain terminology will be used in the following description of the chain tensioner 64 for convenience in reference only, and is not to be construed as limiting. For example, reference is made to FIG. 2 wherein a "front" surface of the tensioner faces toward the slack strand 60, a "rear" surface of the tensioner faces away from the slack strand, an "upper" surface of the tensioner projects orthogonally out of the Figure, a "lower" surface of the tensioner projects orthogonally into the Figure, a "leading" or "pivotal" end of the tensioner is proximate the drive wheel 52, a "trailing" or "free" end of the tensioner is proximate the driven wheel 54, and a "width" of the tensioner extends orthogonally from the lower surface to the upper surface of the tensioner.

Figure 3:
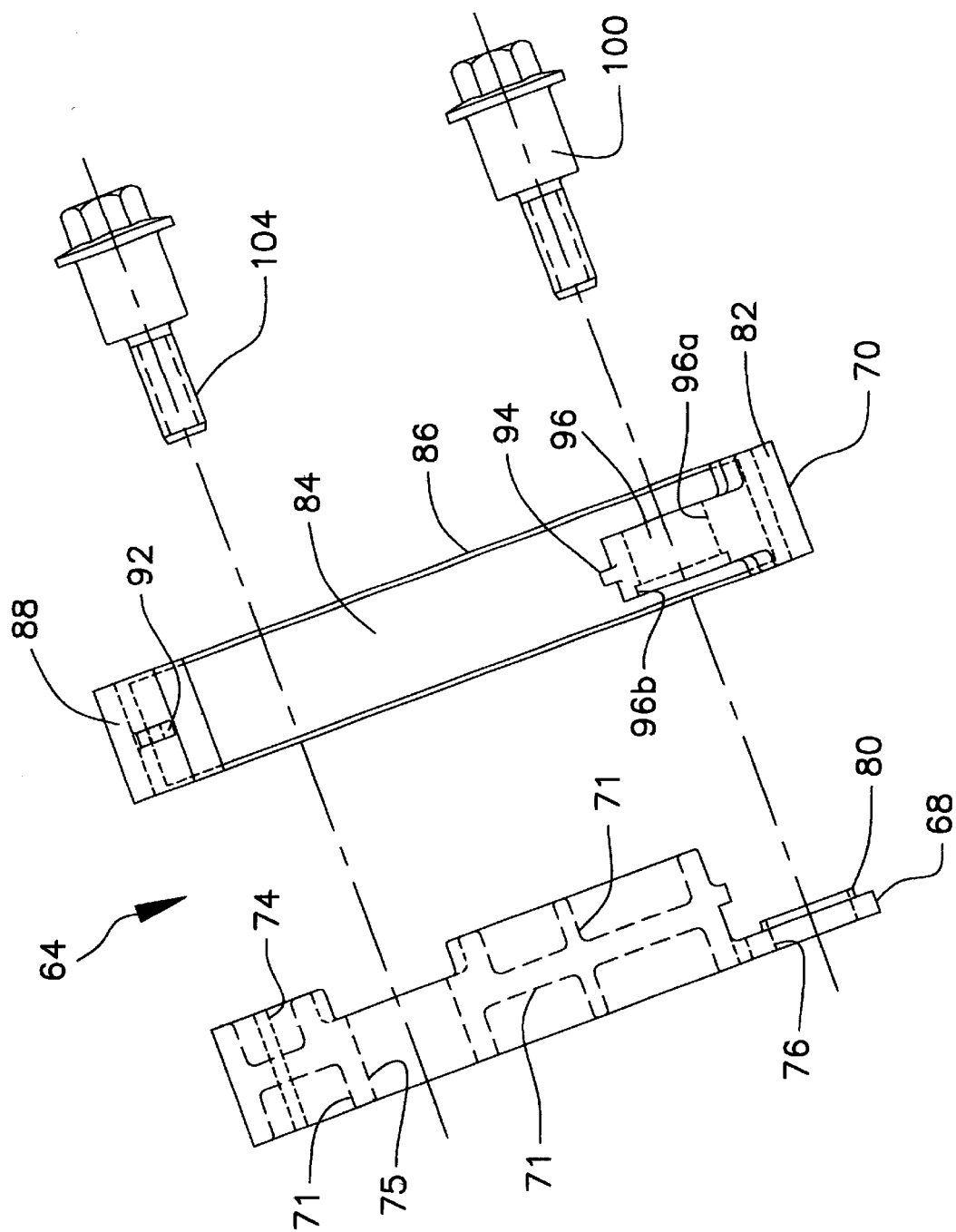
FIG. 3 is an exploded rear view of the tensioner of FIG. 2.
Figure 3A:
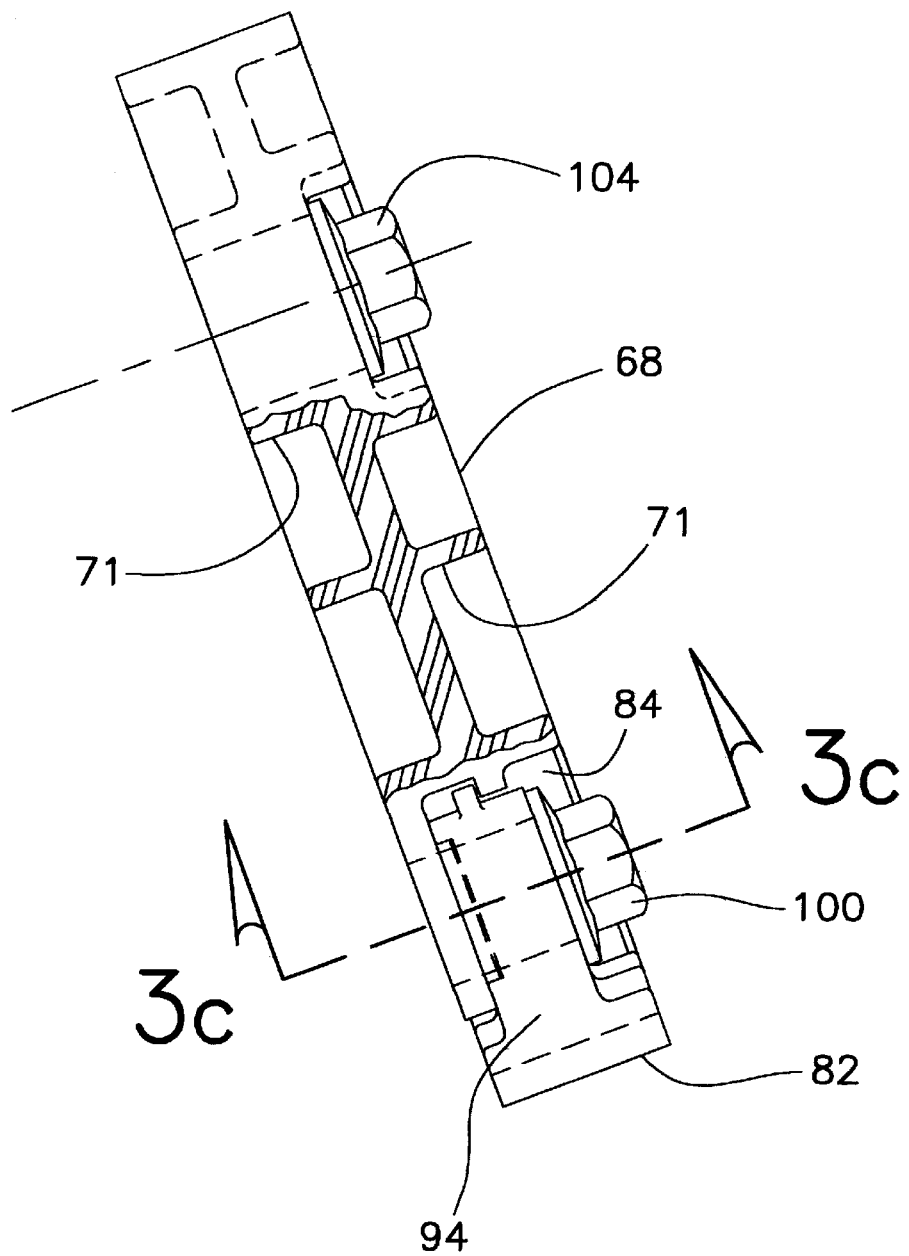
FIG. 3a is a rear view, partially broken-away, of the tensioner taken along the line 3a—3a in FIG. 2.

With continued reference to FIG. 2, the chain tensioner 64 includes a bracket 68 and a shoe or blade sub-assembly 70. The bracket 68 is generally elongate and has an I-Beam construction with a number of stiffening ribs 71 (FIGS. 3 and 3a). A reaction or bearing surface 72 (FIGS. 4 and 4a) is formed on a front surface of the bracket 68 proximate a free end thereof. With continued reference to FIGS. 4 and 4a, a rearwardly-extending recess 73 is formed along an intermediate portion of the front bearing surface 72. An installation pin aperture 74 extends widthwise through a free end of the bracket 68 and communicates with the recess 73. Referring again to FIGS. 3 and 3a, a first aperture 75 and a second aperture 76 extend through the bracket 68. Each aperture 75, 76 is positioned generally along a bracket longitudinal axis 78 (FIG. 2). A raised annular hub 80 extends from an upper surface of the bracket around the aperture 76.

The bracket 68 is preferably manufactured from a filled synthetic plastic material. In the embodiment being described, the bracket 68 is formed by injection molding a synthetic plastic material (e.g. nylon) with a filler material (e.g. fiberglass or carbon fiber), as required for part strength. It should be appreciated that a synthetic plastic bracket 68 reduces the weight of the tensioner 64, and is more cost-effective than a metal bracket. Further, the nylon bracket beneficially decreases the transmission of noise and vibration compared to a metal bracket, thereby enhancing the noise, vibration, and harshness (NVH) characteristics of the drive.

Figure 3B:
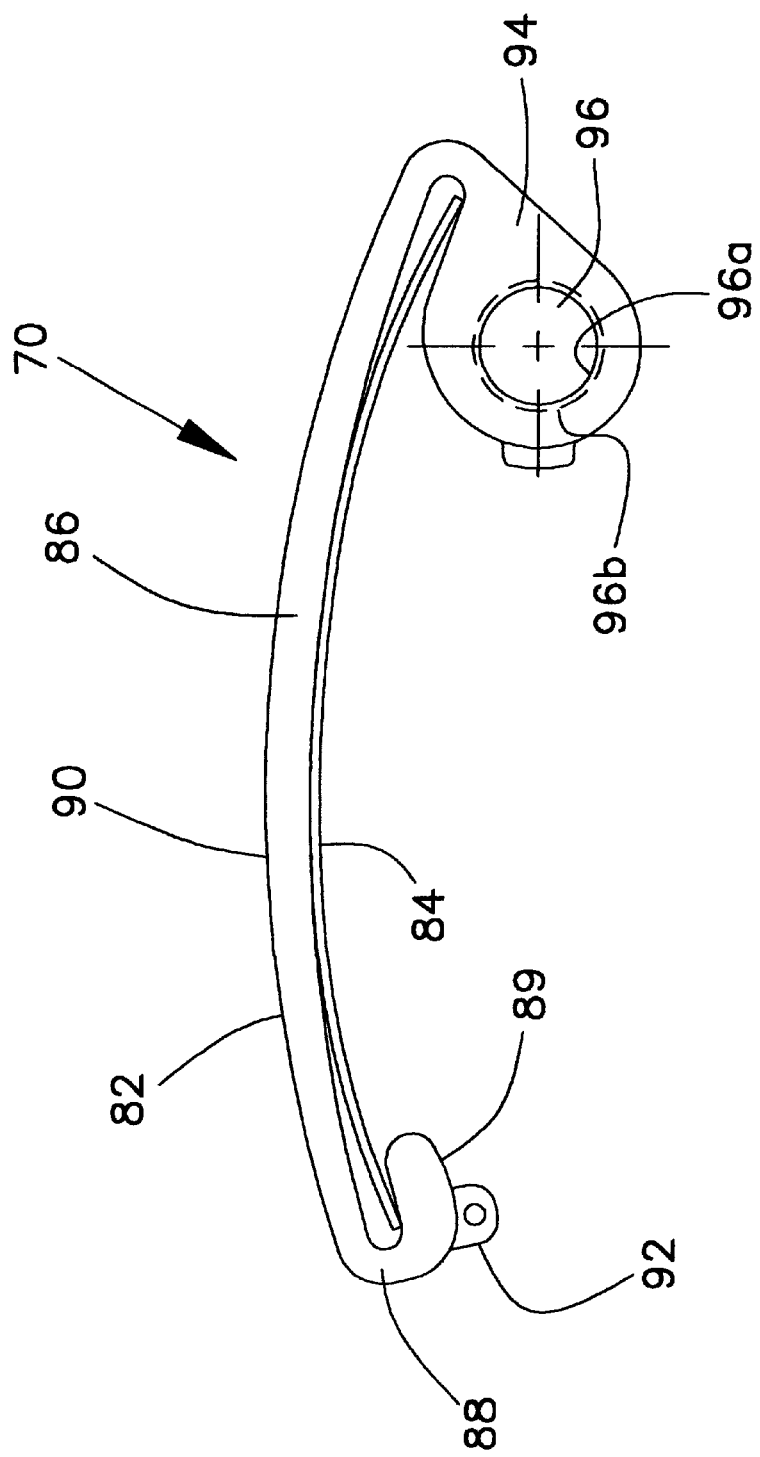
FIG. 3b is an elevation view of a shoe sub-assembly of the tensioner of FIG. 3.

With reference now to FIG. 3b, the shoe sub-assembly 70 includes a chain-engaging shoe member 82, and a blade spring 84 that is mechanically interlocked to the shoe member 82 to provide the shoe subassembly 70 with the resiliency and rigidity that is necessary to apply the proper amount of tensioning force to the slack strand 60. U.S. Pat. No. 5,711,732 describes one satisfactory method for mechanically interlocking the blade spring 84 to the shoe member 82, and is incorporated herein by reference for all that it teaches.

The shoe member 82 includes an elongate section 86 having a hook or U-shaped free end or boss 88. In an operating position of the tensioner, the rear surface 89 of the boss 88 is adapted to slide along the bracket bearing surface 72 (FIG. 4a) in response to a dynamic action of the slack strand (60). That is, the slack strand dynamic movement is in response to the valve events at the camshaft, or camshaft torsionals, and the firing pulses at the crankshaft. Acting together, the camshaft and crankshaft torsional inputs to the chain, and to the tensioner acting through the chain, cause the shoe sub-assembly 70 to stroke dynamically (in a controlled manner) in the firing engine.

A front surface 90 of the elongate section is adapted to engage and apply the necessary tension forces to the chain. A locking pin engaging tab 92 extends from the rear surface 89 of the U-shaped end portion 88. An aperture extends through the locking pin engaging tab 92. An enlarged tab portion 94 extends from the rear surface of the elongate section 86 at a pivotal end thereof. As best shown in FIG. 3, the tab portion 94 is reduced in width relative to the elongate section 86. An aperture 96 extends through the tab portion 94. The aperture 96 has a first diameter portion 96a that communicates with a front surface of the tab portion 94, and a counterbored or second diameter portion 96b that communicates with a rear surface of the tab portion 94. The counterbored portion 96b is adapted to receive the raised hub 80 of the bracket 68.

In the embodiment being described, the shoe member 82 is formed by injection molding an unfilled plastic resin (e.g. nylon) material. It should be appreciated that a shoe member 82, molded from an unfilled plastic resin material, will beneficially "creep" under load and elevated temperatures. The blade spring 84 is preferably formed from spring steel.

Figure 3C:
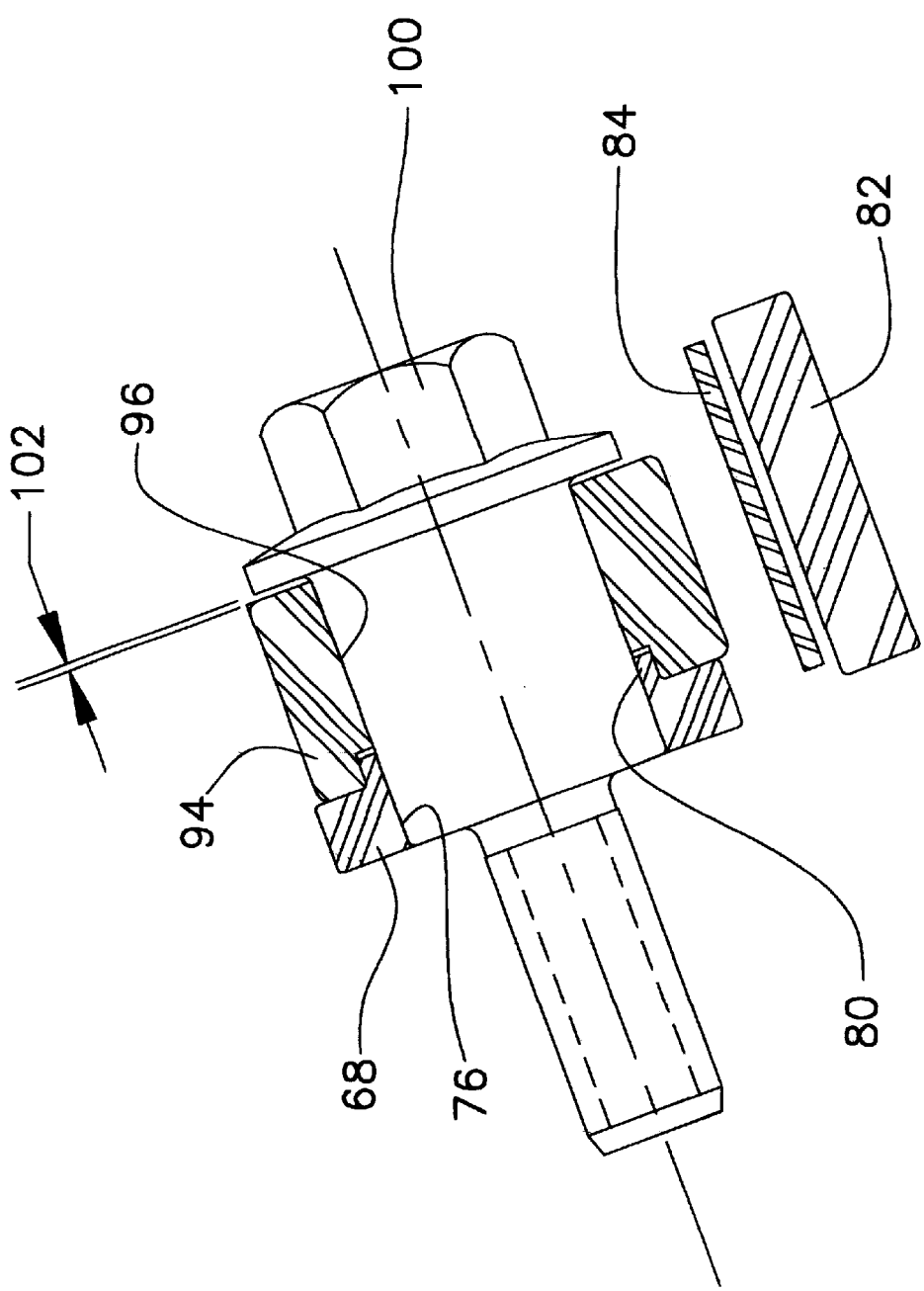
Figure 4A:
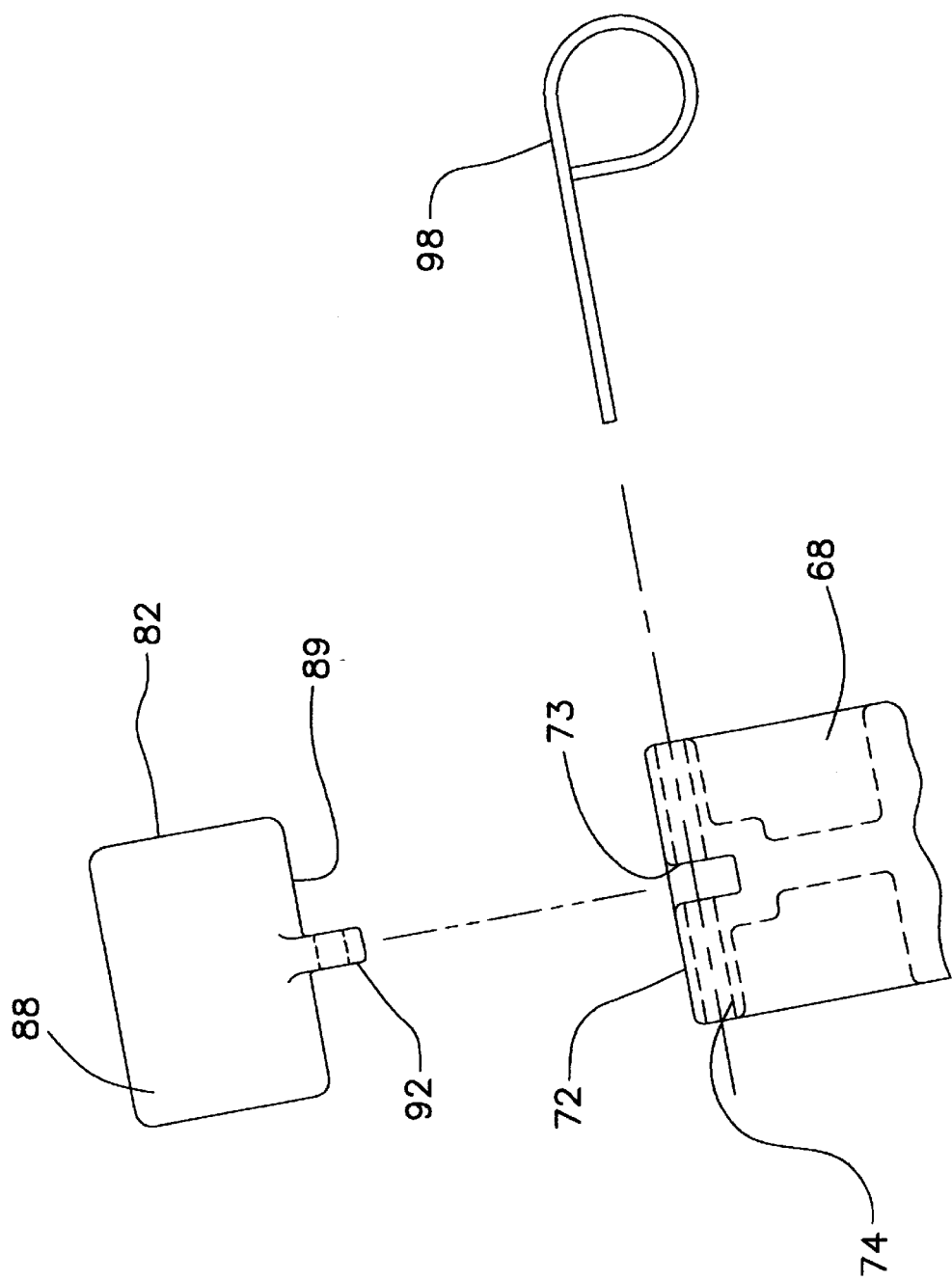
FIG. 4a is an exploded end view of the tensioner free end in FIG. 4.

The shoe sub-assembly 70 is joined to the bracket 68 to form a one-piece assembly during the manufacturing process. More particularly, during an assembly step, the tab aperture 96 of the shoe sub-assembly 70 is positioned or piloted over bracket hub 80 (FIG. 3c), the shoe sub-assembly 70 is pivoted on the hub 80 to position the blade locking tab 92 within the bracket recess 73 (FIGS. 4 and 4a), and then an installation pin 98 is inserted through the bracket aperture 74 and blade locking tab 92 (FIGS. 4 and 4a).

The result is a shoe sub-assembly 70 that is mechanically interlocked in a fixed and proper position to the bracket 68 as a one-piece tensioner assembly until the tensioner is installed in an engine against the chain strand to be tensioned. That is, the blade locking tab 92, in conjunction with the installation pin 98 and bracket pivot hub 80, serves to maintain a one-piece assembly with a desired blade geometry, until the tensioner 64 is bolted in place in the engine. It should be appreciated that, in an operating position of the tensioner, with the blade locking tab 92 positioned within the bracket recess 73, the blade locking tab 92 restricts side-to-side movement of the shoe sub-assembly 70 at the free end thereof. The bracket recess 73, aperture 74, blade locking tab 92, and locking pin, 98 cooperate to define a mechanical locking or securing means or feature 99 of the tensioner 64.

The one-piece tensioner assembly is installed or otherwise mounted to an engine following that of the chain and sprockets. Once the tensioner assembly is mounted to the engine, the installation pin 98 is removed and discarded. The shoe sub-assembly 70 is pivotally secured to the bracket 68 by a first shoulder bolt 100 (FIGS. 3 and 3a). As best seen in FIG. 3c, the pivot end bolt 100 permits the shoe sub-assembly 70 to rotate freely in the firing engine. That is, there is a small amount of axial clearance 102 under all dimensional stack conditions when the pivot end shoulder bolt 100 is securely fastened to the engine case or block.

A second shoulder bolt 104 clamps the bracket to the engine case or block. In the embodiment being described, the shoulder bolt 104 is positioned very close to, and substantially rearward of, the bracket bearing surface 72. It is contemplated that the shoulder bolts 100, 104 can be replaced by conventional bolts and spacers.

It should be appreciated that the synthetic plastic (e.g. nylon) bracket 68 permits the fastener 100 at the pivot end to serve as both a pivot pin for the shoe sub-assembly 70 as well as a bracket fastener. A suitable fastener/pivot pin arrangement for a synthetic shoe sub-assembly is described in Applicant's co-pending U.S. patent application Ser. No. 09/471,783, filed on Dec. 23, 1999, the disclosure of which is hereby incorporated by reference for all that it teaches. While it may be technically feasible, it would not be economically feasible to permit a fastener associated with a stamped metal bracket to serve as both a pivot pin as well as a fastener due to the complexity involved stamping structures for interlocking the shoe sub-assembly 70 to the bracket, as disclosed in the above-captioned U.S. Patent Application.

Further, the bracket 68 also permits greater flexibility in selecting the fastener location at the bracket free end. That is, with an injection molded synthetic plastic bracket, unlike a stamped metal bracket, it is possible to provide a fastener location proximate the free end of the shoe-assembly (assuming that a fastener can be located proximate the free end without interfering with fluid passageways associated with the engine block).

Figure 5:
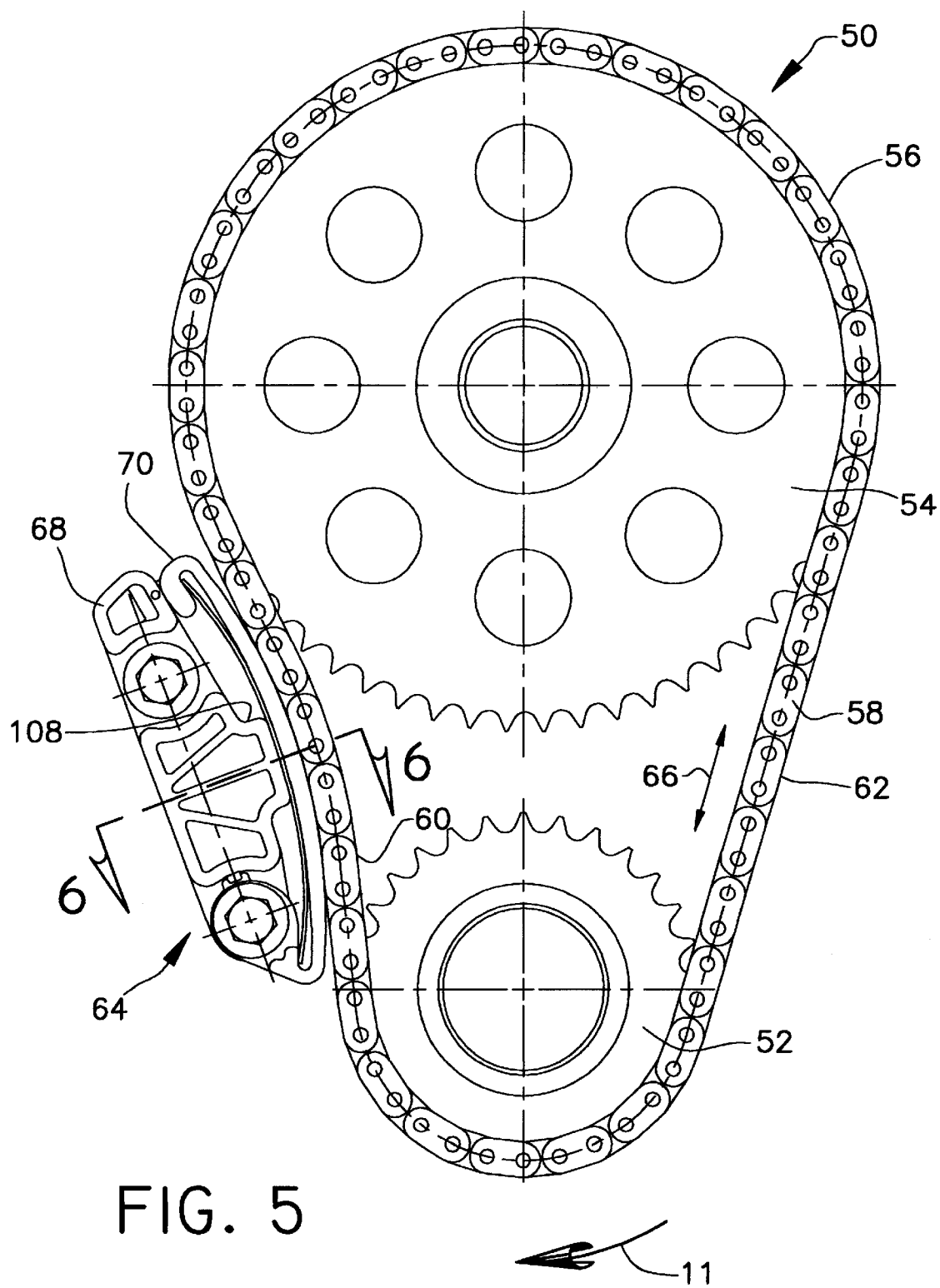
FIG. 5 illustrates an exemplary automotive chain drive installation including a tensioner in accordance with a second embodiment of the present invention.
Figure 6:
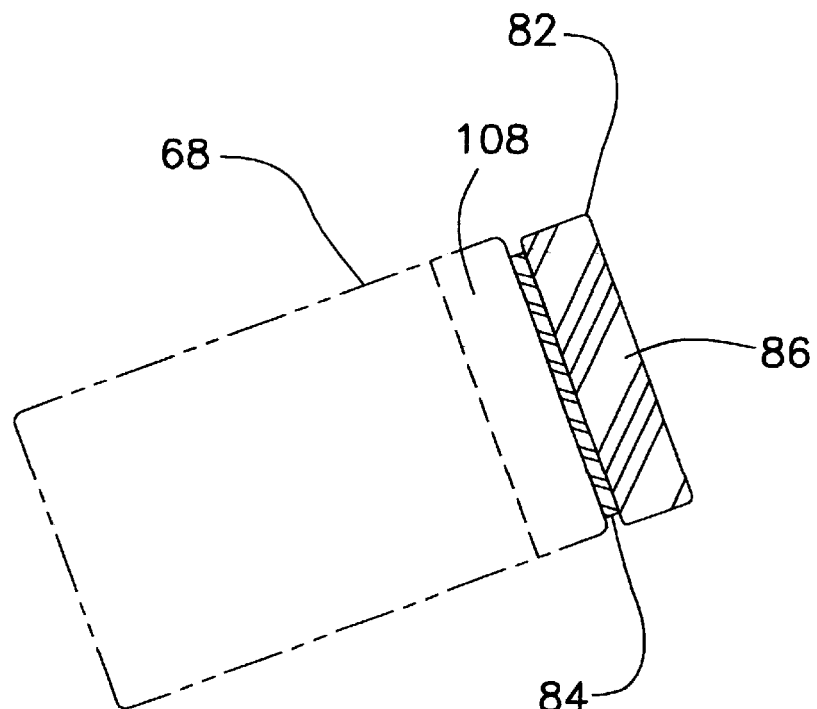
FIG. 6 is a section view taken along the line 6—6 through an intermediate portion of the tensioner of FIG. 5.
Figure 6A:
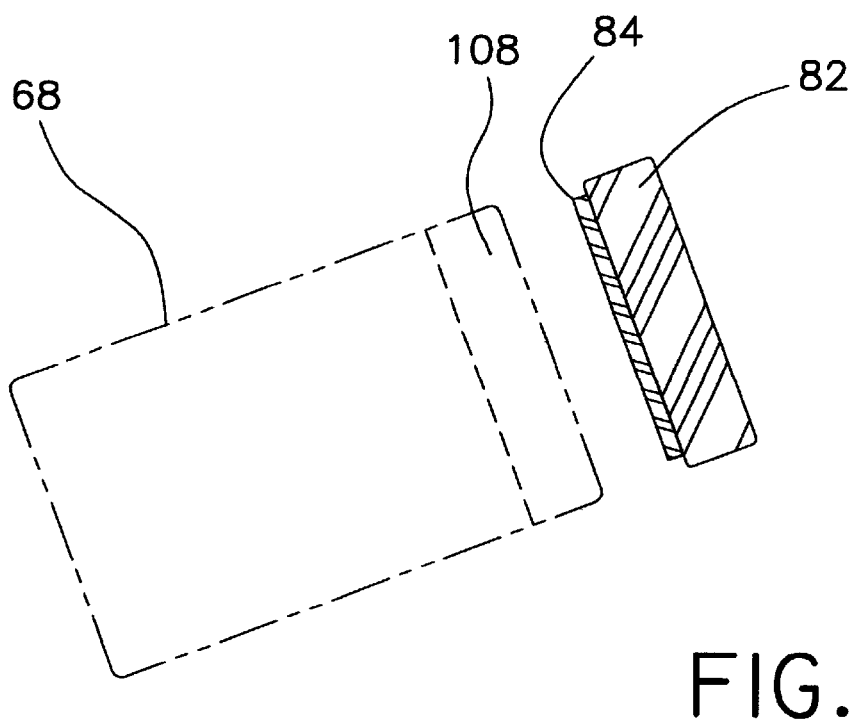
FIG. 6a illustrates a shoe sub-assembly moved inward off a displacement stop of the bracket of FIG. 6.

With reference now to the second chain tensioner embodiment of FIGS. 5, 6, and 6a, where like numerals denote the same components illustrated in FIGS. 1–4c, the bracket 68 incorporates a displacement stop 108 that functions to limit the slack strand movement in an outward/rearward direction. The shoe sub-assembly 70 acts to take up and control slack strand movement and vibration in the inward/forward direction from the stop 108. In the embodiment being described, the displacement stop 108 is formed as a substantially planar shoulder portion extending forwardly from an intermediate portion of the bracket. FIG. 6 shows the shoe sub-assembly 70 to be seated on the displacement stop 108. FIG. 6a shows the shoe sub-assembly 70 moved inward and tensioning the chain strand at a new chain path position.

Figure 7:
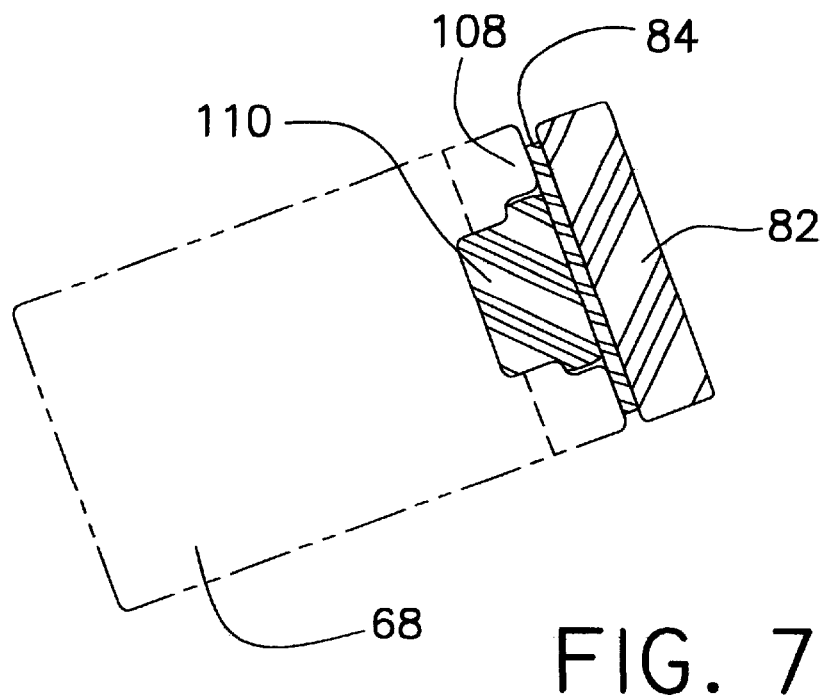
FIG. 7 is a section view, similar to FIG. 6, through an intermediate portion of a tensioner in accordance with a third embodiment of the present invention.
Figure 7A:
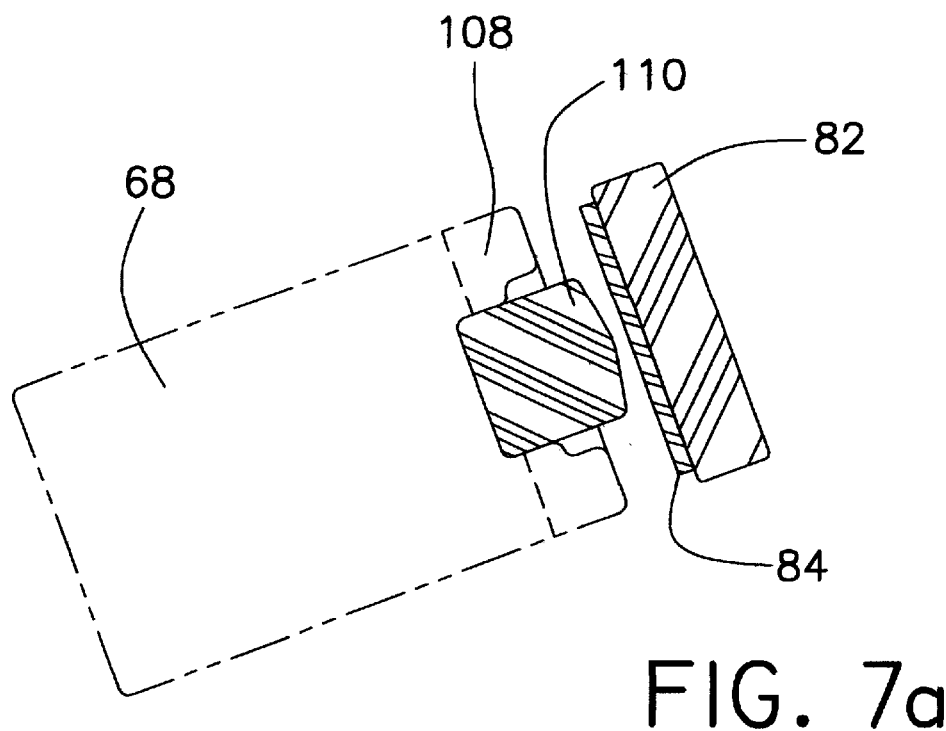
FIG. 7a illustrates a shoe sub-assembly moved inward off a displacement stop of the bracket of FIG. 7.

Referring now to the third chain tensioner embodiment of FIGS. 7 and 7a, where like numerals denote the same components illustrated in FIGS. 1–6a, the displacement stop 108 incorporates a resilient damper or damping mechanism 110 that further limits chain vibration occurring due to valve events and firing pulses of the engine. FIG. 7 shows the shoe sub-assembly 70 to be seated on the displacement stop 108, thereby compressing the damper 110. FIG. 7a shows the shoe sub-assembly 70 moved inward and tensioning the chain strand at a new chain path position, with no compression of the damper 110. The desired damping rate, as the spring moves toward the displacement stop, will determine the profile or shape of the damper. U.S. Pat. No. 5,797,818 describes the reasons for, as well as the advantages and benefits of, a tensioner having such a damper mechanism, and is incorporated herein by reference for all that it teaches.

In the embodiment being described, the damping mechanism 110 is formed as a block of material having a predetermined shape and preferably formed of a resilient rubber or synthetic compound, such a Nitrile or Vamac. It is contemplated that the damper 110 can be made as a separate part and secured to the bracket 68 by a mechanical interlock, or alternatively, it may be either adhesively bonded or molded in place to the bracket.

Figure 8:
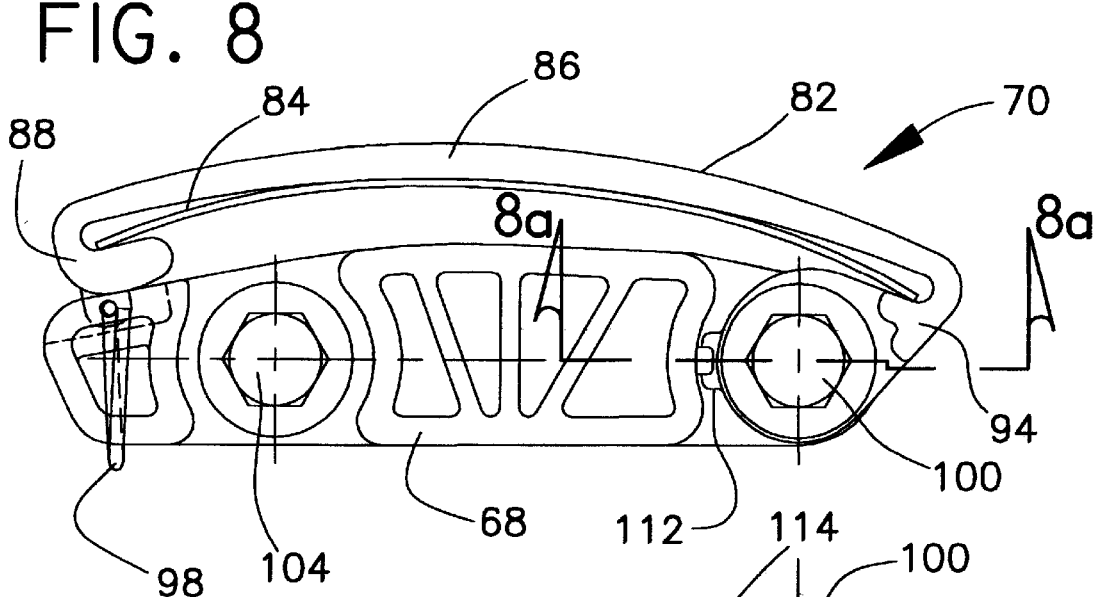
FIG. 8 is a principal view of a tensioner in accordance with a fourth embodiment of the present invention.
Figure 8A:
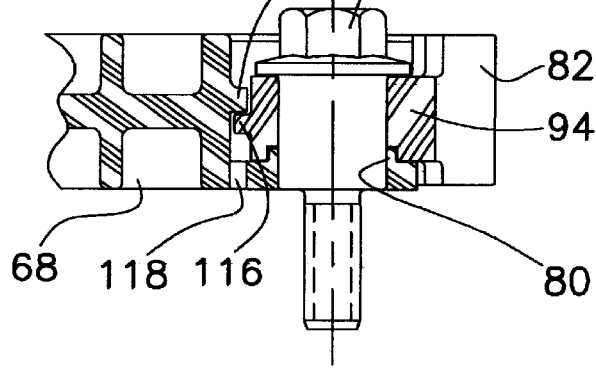
FIG. 8a is a partial view, in section, taken along the line 8a—8a through the pivot area of the tensioner of FIG. 8.
Figure 8B:
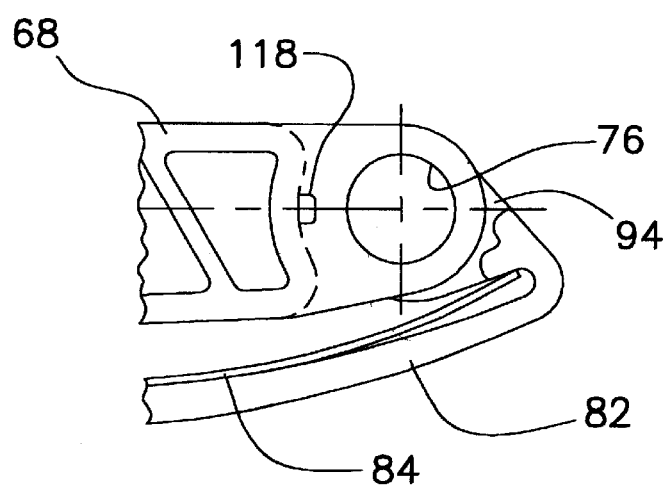
Figure 9:
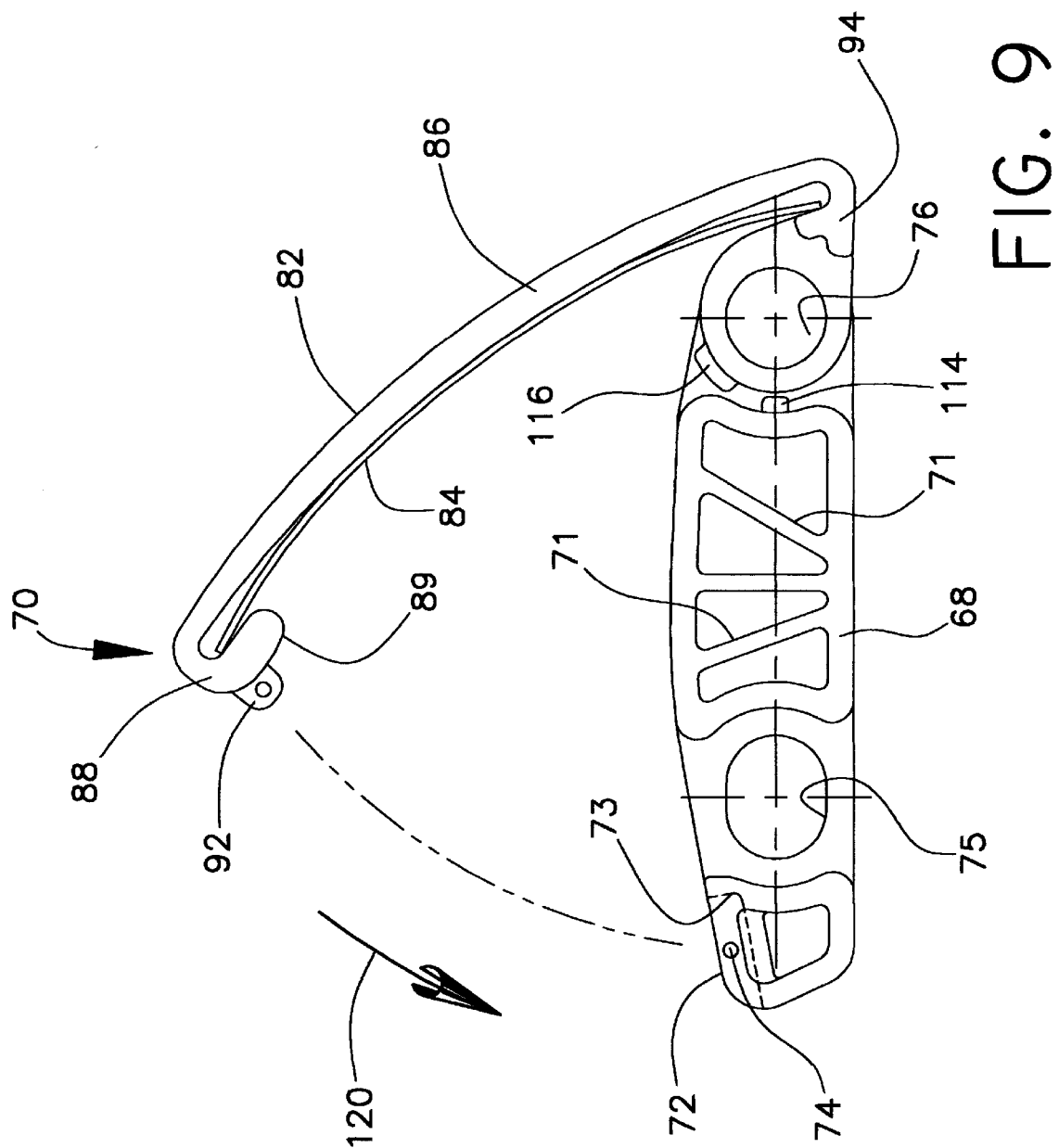
FIG. 9 illustrates the approximate rotational position of a shoe locking flange at the start of shoe assembly with a bracket.

Referring now to the fourth chain tensioner embodiment of FIGS. 8–11, where like numerals denote the same components illustrated in FIGS. 1–4a, the tensioner 64 can additionally or alternately be provided with a mechanical interlock means or feature 112 at the pivot end thereof. As with the first mechanical interlock feature 99, the mechanical interlock feature 112 fixes the shoe sub-assembly 70 to the bracket 68 during the handling of the tensioner and during transit prior to installation. Thus, the mechanical interlock feature 112 is not required once the tensioner is fastened to the engine since the bolt 100 limits axial movement of the shoe sub-assembly 70. The mechanical interlock feature 112 includes a locking tab 114 associated with bracket 68, and a locking flange 116 associated with the shoe sub-assembly 70. With reference to FIG. 8b, in order to facilitate injecting molding the bracket 68 with the locking tab 114, the bracket 68 can include an aperture 118 that communicates with a rear surface of the bracket, and facilitates releasing the mold in a conventional manner.

The locking tab 114 and locking flange 116 cooperate to prevent axial movement of the shoe sub-assembly 70 relative to the bracket 68. The shoe sub-assembly 70 and bracket 68 are brought together for assembly in the orientation shown in FIG. 9. That is, the shoe sub-assembly counterbore 96b (FIG. 3) is piloted over the bracket hub 80 at the angle or position shown in FIG. 9. The shoe sub-assembly is then rotated in the direction of arrow 120 (i.e. counterclockwise) to seat the shoe sub-assembly boss 88 on the bracket reaction surface 72, and to seat the locking flange 116 under the locking tab 114. Thereafter, the installation pin 98 (FIG. 8) is inserted into the aperture 74 to further mechanically lock the shoe sub-assembly 70 to the bracket 68, thereby providing a one-piece tensioner assembly. During installation, once the chain and sprockets are in position, and the one-piece tensioner assembly is mounted to the engine case or block, then the installation pin 98 is pulled and discarded.

Figure 10:
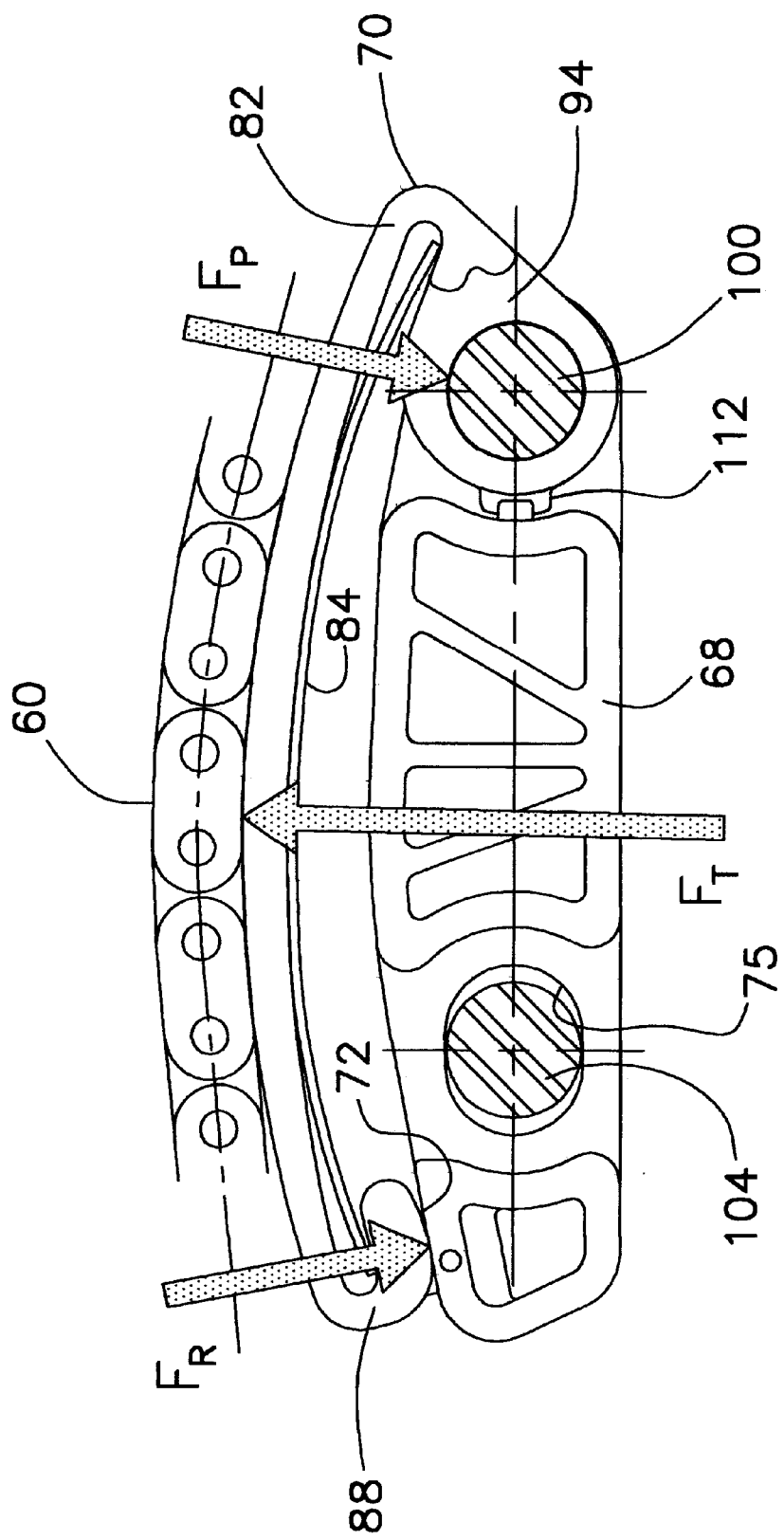
FIG. 10 illustrates a force vector of the shoe sub-assembly acting against the chain, and the shoe sub-assembly reaction force vectors acting on the bracket and pivot bolt.
Figure 11:
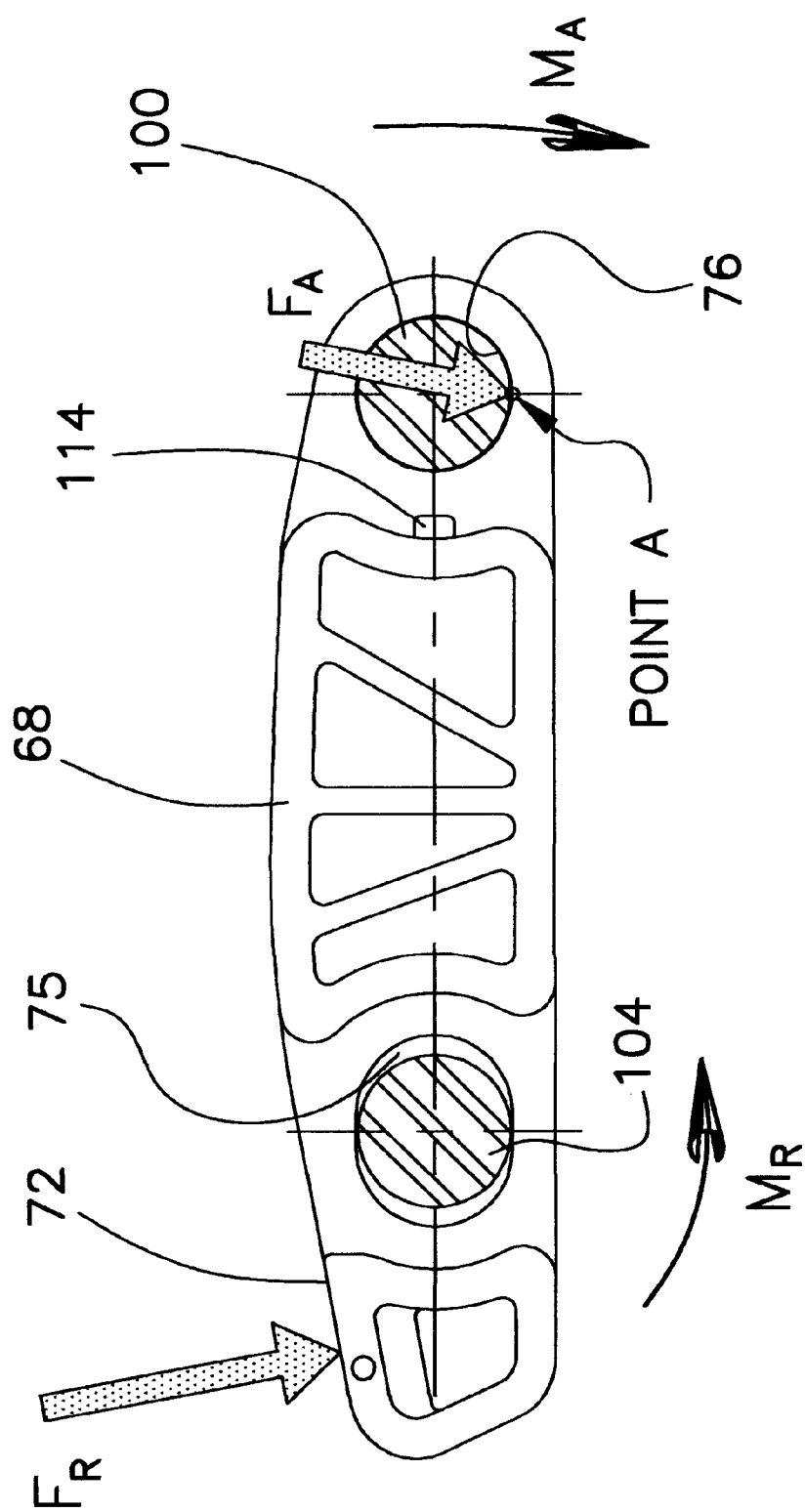
FIG. 11 shows a shoe sub-assembly force vector that acts on the bracket.

FIG. 10 shows the blade force vector $F_T$ acting against the chain, and the reaction vectors $F_R$, acting on the bracket reaction surface 72, and $F_P$ acting on the pivot end fastener 100. It should be noted that the blade tensioner force $F_T$ acts over some chain-blade contact length. $F_T$ is shown as a single vector (algebraic summation of the actual forces) in order to simplify FIG. 10. FIG. 11 illustrates the reaction forces acting on the bracket 68. In that $F_P$ (FIG. 10) acts only on the pivot end fastener 100, force vector $F_R$ will produce a torque or twisting moment $M_R$ acting about the free-end fastener 104, which, when loaded in a firing engine, would tend to force bracket-bolt contact at the approximate six o'clock position (Point A) at the pivot end fastener hole 76. A reaction force $F_A$, acting at Point A, will therefore produce an opposite moment $M_A$, also acting about the pivot end fastener 100, balances or nullifies moment $M_R$.

Figures 12, 12A:
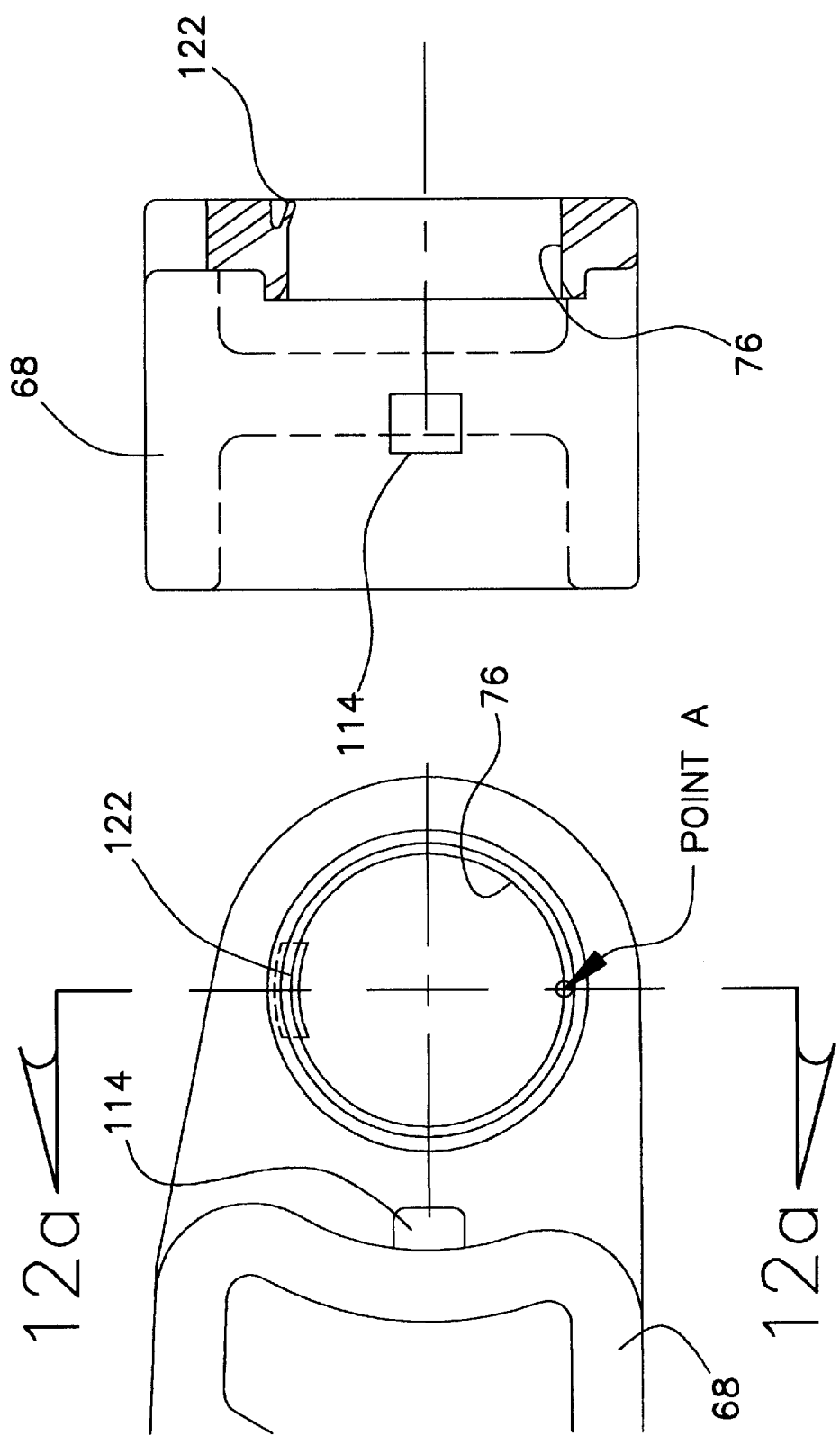
FIG. 12 is an enlarged partial view of the bracket pivot end in accordance with a fifth embodiment of the present invention.
FIG. 12a is a section view taken along the line 12a—12a through the pivot aperture of the bracket of FIG. 12.

Referring now to the fifth chain tensioner embodiment of FIGS. 12 and 12a, where like numerals denote the same components illustrated in FIGS. 1–11, the tensioner 64 can incorporate a feature or means for pre-positioning the bracket 68 during the installation process prior to "loading" the bracket 68 by the reaction force vector $F_R$ (FIGS. 10 and 11). In the embodiment being described, the pre-positioning means includes a resilient, cantilevered flange 122 that extends radially inwardly and rearwardly from a sidewall defining the bracket aperture 76.

The flange 122 is adapted to push the bracket hole 76 to a six o'clock contact (point A) with the bolt 100. The flange 122 deflects to allow entry of the bolt 100, thereby forcing the bracket 68 to a desired position. It is contemplated that the free-end bolt 104 can include rearward projections extending from the bolt flange that serve to clamp the bracket 68 rigidly in place to the engine case. Accordingly, prior to tightening the fasteners in place (finger tight or less), the positioning feature 122 beneficially forces the bracket 68 to be substantially in the position that the firing engine forces acting on it would place it. Then once the fasteners 100, 104 are tightened, the bracket 68 is in a proper position for the pivot end that is not clamped to the engine case. As previously mentioned, the pivot end fastener 100 does not clamp the shoe sub-assembly 70 and bracket 68 rigidly to the engine case. This feature, therefore, will beneficially force the free-end of the bracket 68 to be in hard contact with the fastener 104.

Referring now to the sixth chain tensioner embodiment of FIGS. 13 and 13a, where like numerals denote the same components illustrated in FIGS. 1–12a, the tensioner 64 can incorporate a dowel pin 124 in place of the pivot end bolt 100. The dowel pin 100 is press-fit in the engine case. In this case, the aperture 96 of the one-piece tensioner assembly is piloted over the dowel pin and the free-end bolt 104 is threaded into the engine case to clamp the tensioner to the engine. The dowel pin feature is cost-effective and permits the pivot end to be a smaller "swing" radius, thereby reducing material in the bracket and shoe member 82. Also, it permits a more robust design of the shoe member 82 at the pivot. Further, the dowel pin feature simplifies the engine installation procedure since only one bolt needs to be installed and tightened. It should be noted that the positioning feature 122 (FIGS. 12 and 12a) would necessarily be reversed (i.e. taper radially inwardly in a forward direction) when the dowel pin 124 is used at the pivot.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A chain tensioner comprising:

a bracket defined from a plastic material including a filler material, said bracket comprising a locking tab located adjacent a pivot point defined by said bracket;

a shoe sub-assembly having a pivot end that is pivotally secured to the bracket at said pivot point of said bracket, the shoe sub-assembly formed from a plastic material and comprising a locking flange located at said pivot end, wherein said locking tab of said bracket overlaps with and engages said locking flange of said shoe sub-assembly to prevent separation of said shoe sub-assembly from said bracket when said shoe sub-assembly is pivoted to a first angular position relative to said bracket, and wherein said shoe sub-assembly is separable from said bracket when said shoe sub-assembly is pivoted to a second angular position relative to said bracket.

2. A chain tensioner comprising a molded bracket and a shoe sub-assembly secured to the bracket for movement relative to the bracket during use, the shoe sub-assembly comprising a chain-engaging shoe member and a blade spring connected to the shoe member, said shoe member comprising a plastic material and the molded bracket comprising a plastic material with a filler added thereto, said shoe member comprising a first end pivotally connected to the bracket, a second end spaced from the first end, and a chain-engaging surface connecting the first and second ends, said bracket defining a bearing surface upon which said second end of said shoe member is slidably supported so that said second end of said shoe member slides on said bearing surface and said first end of said shoe member pivots relative to said bracket in response to flexing of said chain-engaging surface, said chain tensioner further comprising a first fastener that extends through said first end of said shoe member and said bracket to secure the bracket to an associated engine and serve as a pivot pin about which said first end of said shoe-assembly pivots relative to said bracket.

3. A chain tensioner comprising a molded bracket and a shoe sub-assembly secured to the bracket for movement relative to the bracket during use, the shoe sub-assembly comprising a chain-engaging shoe member and a blade spring connected to the shoe member, said shoe member comprising a plastic material and the molded bracket comprising a plastic material with a filler added thereto, said shoe member comprising a first end pivotally connected to the bracket, a second end spaced from the first end, and a chain-engaging surface between the first and second ends, said bracket defining a bearing surface upon which said second end of said shoe member is slidably supported so that said second end of said shoe member slides on said bearing surface and said first end of said shoe member pivots relative to said bracket in response to flexing of said chain-engaging surface, said bracket further comprising a displacement stop that abuts the shoe sub-assembly and limits displacement of an associated drive chain in an operating state of an associated engine, said displacement stop comprising a resilient damper that compresses in response to contact with the shoe sub-assembly.

4. A chain tensioner comprising a bracket and a shoe sub-assembly pivotally secured to the bracket, the shoe sub-assembly formed from a plastic material and the bracket formed from a plastic material with a filler material added thereto, wherein the bracket includes a fastener aperture and a raised hub surrounding the fastener aperture; the shoe-sub-assembly includes a tab portion having a tab aperture; and, the tab aperture has a counterbored portion adapted to receive the raised hub when the shoe sub-assembly is joined to the bracket such that the bracket aperture and the tab aperture are axially aligned to receive one of an associated fastener and an associated dowel pin.

5. A chain tensioner comprising a molded bracket and a shoe sub-assembly secured to the bracket for movement relative to the bracket during use, the shoe sub-assembly comprising a chain-engaging shoe member and a blade spring connected to the shoe member, said shoe member comprising a plastic material and the molded bracket comprising a plastic material with a filler added thereto, said shoe member comprising a first end pivotally connected to the bracket, a second end spaced from the first end, and a chain-engaging surface between the first and second ends, said bracket defining a bearing surface upon which said second end of said shoe member is slidably supported so that said second end of said shoe member slides on said bearing surface and said first end of said shoe member pivots relative to said bracket in response to flexing of said chain-engaging surface, said bracket further comprising a pivot end aperture adapted to receive one of an associated fastener and an associated dowel pin to secure said first end of said shoe member pivotally to said bracket, the aperture including a radially inwardly extending resilient positioning flange adapted to engage an associated fastener or an associated dowel pin inserted through said pivot end aperture to thereby position said bracket in a select position relative to the associated fastener or associated dowel pin.

* * * * *